United States Patent
Götz et al.

(10) Patent No.: US 12,073,303 B2
(45) Date of Patent: Aug. 27, 2024

(54) METHOD FOR PRODUCING A TEST DATA RECORD, METHOD FOR TESTING, METHOD FOR OPERATING A SYSTEM, APPARATUS, CONTROL SYSTEM, COMPUTER PROGRAM PRODUCT, COMPUTER-READABLE MEDIUM, PRODUCTION AND USE

(71) Applicant: SIEMENS INDUSTRY SOFTWARE NV, Leuven (BE)

(72) Inventors: Jan Götz, Buckenhof (DE); Andrés Botero Halblaub, Kirchseeon (DE)

(73) Assignee: Siemens Industry Software NV, Leuven (BE)

( * ) Notice: Subject to any disclaimer, the term of this patent is extended or adjusted under 35 U.S.C. 154(b) by 813 days.

(21) Appl. No.: 17/254,296

(22) PCT Filed: May 17, 2019

(86) PCT No.: PCT/EP2019/062774
§ 371 (c)(1),
(2) Date: Dec. 20, 2020

(87) PCT Pub. No.: WO2019/242955
PCT Pub. Date: Dec. 26, 2019

(65) Prior Publication Data
US 2021/0216063 A1    Jul. 15, 2021

(30) Foreign Application Priority Data
Jun. 20, 2018 (EP) .................................. 18178772

(51) Int. Cl.
*G06N 3/08* (2023.01)
*G05B 19/418* (2006.01)
(Continued)

(52) U.S. Cl.
CPC .......... *G06N 3/044* (2023.01); *G05B 19/4183* (2013.01); *G05B 19/41885* (2013.01); *G06F 18/214* (2023.01); *G06N 3/08* (2013.01)

(58) Field of Classification Search
CPC ........ G06N 3/044; G06N 3/08; G06F 18/214; G05B 19/4183; G05B 19/41885
See application file for complete search history.

(56) References Cited

U.S. PATENT DOCUMENTS

2018/0060759 A1* 3/2018 Chu ....................... G06N 20/00
2018/0089911 A1   3/2018 Rath et al.
(Continued)

FOREIGN PATENT DOCUMENTS

CN    106844949 A    6/2017
CN    107330444 A    11/2017
(Continued)

OTHER PUBLICATIONS

Japanese Notice of Allowance for Japanese Patent Application No. 2020-570681 dispatched Oct. 5, 2021, with English translation.
(Continued)

*Primary Examiner* — Gary Collins
(74) *Attorney, Agent, or Firm* — Lempia Summerfield Katz LLC

(57) ABSTRACT

The invention relates to a method for producing a test data record (12) for an algorithm (1), comprising the following steps: 1.1 a trained artificial intelligence (8) is provided. 1.2 the artificial intelligence (8) is stimulated, particularly using a random signal (11) and/or using a quasi linearity property for visual concepts, and 1.3 the artificial intelligence (8) produces at least one test data record (14), which comprises image data (15) and action regions (16) associated with the image data (1*g*) and/or sensor data and action regions associated with the sensor data. The invention furthermore (Continued)

relates to a method for operating a system for the automated, image-dependent control of a device and an apparatus for carrying out the aforementioned method. Finally, the invention relates to a control system for a device which comprises such an apparatus, and a computer program product, a computer-readable medium, the production of a data storage device and the use of an artificial intelligence (8).

14 Claims, 5 Drawing Sheets

(51) Int. Cl.
*G06F 18/214* (2023.01)
*G06N 3/044* (2023.01)

(56) References Cited

U.S. PATENT DOCUMENTS

| 2018/0203445 | A1* | 7/2018 | Micks | G06F 30/20 |
| 2018/0307238 | A1* | 10/2018 | Wisniowski | G05D 1/0246 |
| 2019/0042679 | A1* | 2/2019 | Stefan | G06F 30/20 |
| 2019/0213103 | A1* | 7/2019 | Morley | G06F 11/3692 |

FOREIGN PATENT DOCUMENTS

| CN | 107577996 A | 1/2018 |
| JP | 2018113015 A | 7/2018 |
| KR | 101813698 B1 | 1/2018 |

OTHER PUBLICATIONS

European Search Report for European Application No. 18178772. 2-1221 dated Jan. 4, 2019.
Goodfellow, Ian, et al. "Generative adversarial nets." Advances in neural information processing systems. 2014.
Hochreiter, Sepp, and Jürgen Schmidhuber. "Long short-term memory." Neural computation 9.8 (1997): 1-33.
International Search Report and the Written Opinion for International Patent Application PCT/EP2019/062774 mailed Jul. 29, 2019.
Liu, Ming-Yu, Thomas Breuel, and Jan Kautz. "Unsupervised image-to-image translation networks." Advances in neural information processing systems 30 (2017): 1-11.
Radford, Alec, Luke Metz, and Soumith Chintala. "Unsupervised representation learning with deep convolutional generative adversarial networks." arXiv preprint arXiv:1511.06434 (2015). 1-16.
Tian, Yuchi, et al. "Deeptest: Automated testing of deep-neural-network-driven autonomous cars." Proceedings of the 40th international conference on software engineering. 2018. 303-314.
Alzantot, Moustafa, Supriyo Chakraborty, and Mani Srivastava. "Sensegen: A deep learning architecture for synthetic sensor data generation." 2017 IEEE International Conference on Pervasive Computing and Communications Workshops (PerCom Workshops). IEEE, 2017. pp. 1-7.
Korean Office Action for Korean Application No. 10-2021-7001806 dated Jun. 3, 2021.

* cited by examiner

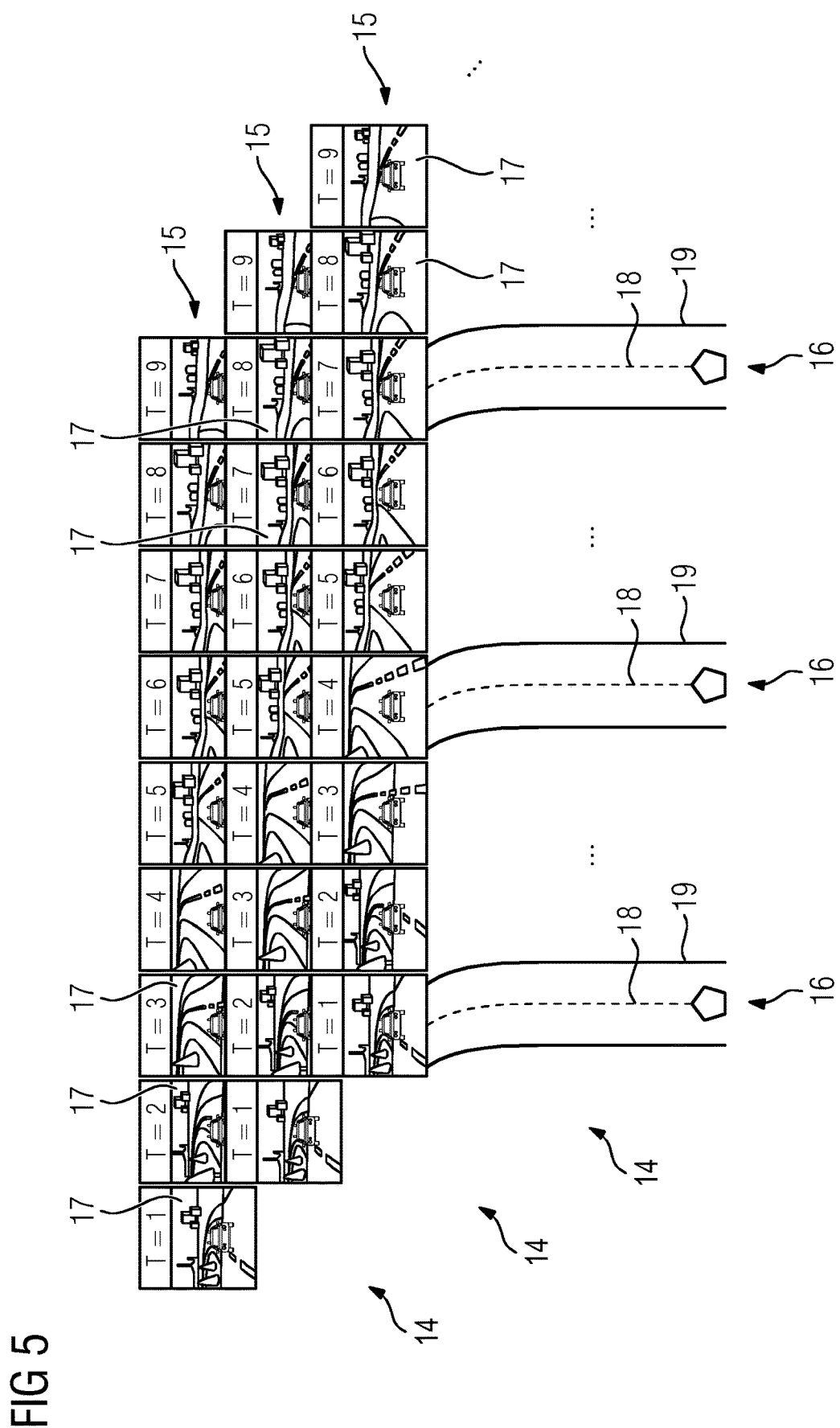

METHOD FOR PRODUCING A TEST DATA RECORD, METHOD FOR TESTING, METHOD FOR OPERATING A SYSTEM, APPARATUS, CONTROL SYSTEM, COMPUTER PROGRAM PRODUCT, COMPUTER-READABLE MEDIUM, PRODUCTION AND USE

This application is the National Stage of International Application No. PCT/EP2019/062774, filed May 17, 2019, which claims the benefit of European Patent Application No. EP 18178772.2, filed Jun. 20, 2018. The entire contents of these documents are hereby incorporated herein by reference.

BACKGROUND

The present embodiments relate to a method for generating a test data set for an algorithm and also a method for testing such a test data set. Further, the present embodiments relate to a method for operating a system for the automated image-dependent control of a facility and an apparatus for implementing the above-mentioned methods. The present embodiments also relate to a control system for a facility that includes such an apparatus, a computer program product, a computer-readable medium, the production of a data carrier, and the use of an artificial intelligence.

In the field of the development of control software, the testing of software represents a significant part of the development outlay. This is due inter alia to the fact that the design of quality tests is complex and it is difficult and not trivial to detect errors. For example, the more complex an algorithm that is to be tested, the more complex the tests for this algorithm also are. Above all, it is also difficult to test "comprehensively" (e.g., to achieve a required testing coverage).

Algorithms for image processing are associated with the most complex algorithms in computer systems. It is known to the applicant that, by way of example, algorithms that are used in the field of advanced driver assistance (ADAS) or autonomous vehicle control are subjected to a human inspection by testing scenarios that relate to recorded test data sets, or "real life tests" take place on test sites or in the real environment.

An inspection may take place against predefined "best case actions" in real video sequences that are recorded in advance and are produced with a high degree of human intervention. Each new test case is produced manually and does not permit any room for randomness in the testing scenario.

The known approaches have in common the fact that both the test data as well as an expected behavior distinguish themselves by a close interaction with a human participant and are accompanied by a difficult integration into an automated testing setup. An expansion of the tests is complex and difficult.

It is also known that in the case of some manufacturers, the test phase is even expanded to a period of time following the delivery of the product and test data is collected during monitored autonomous driving procedures in order to improve the algorithms based upon this test data.

SUMMARY AND DESCRIPTION

The scope of the present invention is defined solely by the appended claims and is not affected to any degree by the statements within this summary.

The present embodiments may obviate one or more of the drawbacks or limitations in the related art. For example, improved possibilities for testing complex image processing algorithms are provided.

A method for generating at least one test data set for an algorithm that obtains image data as an input and outputs areas of action that are dependent upon the image data as an output, and/or obtains sensor data as an input and outputs areas of action that are dependent upon the sensor data as an output is provided. The method includes: 1.1—a trained artificial intelligence is provided; 1.2—the artificial intelligence is stimulated; and 1.3—the stimulated artificial intelligence generates at least one test data set that includes image data and areas of action that are associated with the image data and/or sensor data and areas of action that are associated with the sensor data.

In act 1.1, an artificial intelligence that includes long short-term memory networks or is provided by such networks is provided. Further, in act 1.1, an artificial intelligence that includes at least one generative network and/or at least one discriminative network or is provided by such a network may be provided. Then, in act 1.2, at least one generative network of the artificial intelligence may be stimulated, and in act 1.3, at least one stimulated generative network of the artificial intelligence may output a test data set. The generative adversarial networks (e.g., the at least one generative and/or the at least one discriminative network) may be artificial neural networks.

In principle, the terms "system" or "model" may also be used synonymously as an alternative to the expression "network".

In act 1.1, a trained artificial intelligence that has been conditioned using a learning data set may be provided. A learning data set that includes real image data that is recorded by at least one image capturing facility, and areas of action that are associated with the real image data, and/or real sensor data that is recorded by at least one sensor facility, and areas of action that are associated with the real sensor data may be used.

In order to obtain the trained artificial intelligence that is provided in act 1.1, the following acts may be implemented: 2.1—a learning data set that includes real image data that is recorded by at least one image capturing facility, and areas of action that are associated with the real image data and/or real sensor data that is recorded by at least one sensor facility and areas of action that are associated with the real sensor data is provided; 2.2—an artificial intelligence is provided; and 2.3—the artificial intelligence is conditioned using the learning data set that is provided.

For the artificial intelligence that is provided in act 1.1 and/or for the artificial intelligence that is provided in act 2.2, the artificial intelligence may include adversarial networks (e.g., generative adversarial networks) or may be provided by such networks.

The present embodiments are based on the consideration to use an artificial intelligence in order to generate image data and/or sensor data and associated areas of action from an initial data set and with which it is possible to inspect algorithms, for example, in the field of image-dependent (e.g., image sequence-dependent or sensor value-dependent) control for the performance of the algorithms or corresponding behavior. In this case, in accordance with the present embodiments, a trained artificial intelligence is drawn upon.

The artificial intelligence may be conditioned (e.g., trained) using a learning data set that has been obtained, for example, by observing or recording real situations and by human interaction or has, for example, been conditioned/ trained using a learning data set that has been obtained, for example, by observing or recording real situations and by human interaction and is then ready to generate test data.

The data sets that are generated by the trained artificial intelligence represent test data that is obtained in a "synthetic" manner, and the test data is identical and realistic in its type and suitability, for example, to the learning data set that is provided and is indistinguishable from real data. Artificial intelligence methods are, for example, used so as to provide image sequences and the actions that are suitable for the image sequences (e.g., by generative adversarial networks).

For example, high-dimensional data is processed in the form of image sequences, and low dimensional data is processed in the form of areas of action or action corridors that, for example, represent impermissible control parameters in order to train a test case generator in order to classify the performance or the behavior of a, for example, image-dependent or sensor-value-dependent controlling algorithm. The conditioning may be based upon image data and/or sensor data that is supplemented with areas of action as a vectorial numerical series.

The algorithm for which the test data set is intended and that obtains image data as an input, and outputs areas of action that are dependent upon the image data as an output may be a control algorithm. The algorithm may be, for example, an algorithm for controlling a facility (e.g., a vehicle or robot).

The areas of action include, for example, in each case, at least one permissible action (e.g., in each case, multiple permissible actions) or are provided by these permissible actions. In each case, this area is, for example, an area (e.g., desired area) having actions (e.g., control procedures) that are permissible for or in the light of the associated image data or sensor data.

The areas of action represent, in one embodiment, permissible control parameters. The areas of action may represent or include permissible control parameters for a system for the automated, image-supported control of a facility or are formed by such control parameters.

An area of action includes, by way of example, at least one control parameter or control value, or is formed or defined, by way of example, by at least one control parameter or control value. The at least one control parameter or control value may be such a control parameter or control value that represents a permissible action (e.g., control action) in the light of image data or sensor data that is associated with the control parameter or control value. This may be one or more control values or one or more control parameters for a facility that is controlled in a sensor-dependent or image-dependent manner.

In general, for a provided starting situation that may be or is detected by image data and/or sensor data, not only a control parameter or control value is possible/permissible, but rather, there is an associated desired region that includes a plurality of actions or control values or control parameters that represent these actions. An area of action may be defined or formed accordingly by a plurality of control parameters or control values that lie in a desired region or span such a desired region.

The areas of action represent, for example, parameters or values (e.g., control parameters or control values) that are permissible in dependence upon the image data or sensor data with which these areas of action in each case are associated. An area of action may be defined by a plurality/a collection of parameters or values (e.g., control parameters or control values) that if the parameters or values are implemented lead to the fact that an operator moves in the area of action or a permissible area of action (e.g., using a facility, such as a vehicle or robot that is controlled via the algorithm).

An annotated data set having the test information that is required in order to produce further test scenarios is obtained by supplementing the image data and/or sensor data with the areas of action. The individual networks (e.g., the generative and adversarial, discriminative network) may be conditioned by alternate generation by a generative network and inspection (e.g., adversarially) of the generated data (e.g., artificial image data and/or sensor data and associated areas of action) by an adversarial (e.g., discriminative) network.

The pattern of the test data generation, which forms the basis of the present embodiments, is based in this case, for example, on the work of Ian Goodfellow et al. which was published in the essay "Generative Adversarial Nets" (GANs), ArXiv: 1406.2661 [statML]661v1, 10 Jan. 2014, and also the work of Alec Redfort et al. in the essay "Unsupervised Representation Learning with Deep Convolutional Generative Adversarial Networks", ArXiv: 1511.06434V2 [cs.LG], 7 Jan. 2016, and, for example, Sepp Hochreiter and Jürgen Schmidhuber in the essay "Long Short Term Memory" (LSTM) Neural Computation 9 (8): 1735-1780, 1997.

The trained artificial intelligence is stimulated. The stimulation may be provided in that the artificial intelligence is supplied an input (e.g., at least one input file). The artificial intelligence generates an output in response to the stimulation (e.g., to the supply of an input).

The stimulation of the trained artificial intelligence may, in principle, be provided in various ways (e.g., using at least one random signal as an input). A random signal may be provided, by way of example, by an image or an image file that only displays or contains noise.

The stimulation may also be provided using at least one stimulation image (e.g., using two or more stimulation images or stimulation image sequences) and/or using at least one stimulation video that, for example, displays specific contents, scenes, or situations (e.g., driving situations or driving scenes).

The use of stimulation images or sequences of such stimulation images and/or stimulation videos that, for example, display real contents offers, for example, increased control possibilities compared to the use of random signals.

For example, a GAN approach is used in order to generate data sets from an artificial intelligence application in response to, for example, stimulation by a random signal or use of the quasi-linearity property for visual concepts, as is disclosed in the above-mentioned publication "Unsupervised Representation Learning with Deep Convolutional Generative Adversarial Networks" by Alec Redford et al. from the year 2016 (e.g., FIG. 7 on page 10 of this publication). The generative network or the generative algorithm is used in this case inversely with respect to the conventional approach, which provides that in lieu of rendering it possible for the generative network or algorithm to recognize patterns and to classify these patterns, the process is inverted and the system is stimulated by "classification input", for example, of a random signal, and a new "pattern" is generated. Goodfellow and Redford disclose in their articles from the years 2014 and 2016 that new images are generated in an almost linear operation in the vector space. This provides that the algorithm may be more easily tuned in order to generate new sequences.

For example, for the case that for the stimulation the artificial intelligence is supplied with at least one image and/or video (or corresponding file) for the stimulation, and the image and/or video displays contents, scenes, or situations (e.g., real contents, scenes, or situations), it is possible for the artificial intelligence to generate synthetic images or image sequences using or by virtue of a quasi-linearity property for visual concepts.

In this case, "linearity" may, for example, be the superposition principle (image_A+parameter*image_B=image_C). The term "quasi" is, for example, to be understood as the fact that new images or stimulation videos are generated from existing individual images (Function_a(image_A)+parameter*function_b (image_B)=image_C, where function_a and function_b are non-linear functions.

In a purely exemplary manner, an image (e.g., synthetic, generated image) that displays the road with or in rain is obtained from an image that displays a road in good weather and an image that displays rain, taking into consideration the quasi-linearity property of visual concepts. If the artificial intelligence is supplied as stimulation images (e.g., an image with a road in good weather and an image with rain), a synthetic image (e.g., with an associated area of action) that displays the road in rain may be obtained. It is possible in this manner to obtain inter alia new scenarios from existing images; the new scenarios are not originally displayed in the existing images. The combination of road and rain is to be understood in a purely exemplary manner, and other scenes or situations may also be supplied to the artificial intelligence as stimulation images and may naturally also be more than two images.

This principle of the above-mentioned approach "Unsupervised Representation Learning with Deep Convolutional Generative Adversarial Networks" is illustrated in an exemplary manner in FIG. 7 with the aid of images of faces.

Stimulation images and/or stimulation videos may be images or videos that have been recorded, for example, using cameras and display real scenes or situations (e.g., real driving scenes or driving situations). However, it is also not ruled out that, alternatively or in addition, constructed or synthetic images and/or videos may be used for the stimulation of the artificial intelligence.

The trained network(s), system(s), or model(s) may be drawn upon so as to generate new data. New image data and/or sensor data and also associated areas of action may be generated using the trained rules by stimulating, for example, a generative network of the artificial intelligence.

Generated data may be influenced by simple arithmetic operations, for example, by the properties of a GAN. For example, avenue−trees=simple road or also straight road plus curve=chicane.

In one embodiment, in lieu of classical convolutional networks, LSTM networks (e.g., convolutional LSTM networks) are used both for the generating network or networks as well as for the adversarial network or networks. The advantages of the use of LSTM networks above all lie in the fact that time-dependent sequences (e.g., of image data or sensor data and associated areas of action) are obtained and noise effects (e.g., nonphysical artefacts) are avoided by LSTM. The term an "LSTM network" is, for example, a network with which past states are considered. LSTM is a specialization of this type of network. In this manner, it is possible to model the time dependency that, for example, image sequences and areas of action or corridors of action require. LSTM networks that may be used within the scope of the present embodiments are, by way of example, described in the essay "Long Short Term Memory" (LSTM) neural computation 9 (8): 1735-1780, 1997 by Sepp Hochreiter and Jürgen Schmidhuber.

The approach is broadened and renders it possible for convolutional LSTM networks to promptly collect recurring past states in order to train the artificial intelligence that, for example, includes a GAN system or is provided by such a system (e.g., to obtain image data, such as image sequences, and/or sensor data, and associated areas of action). This renders it possible to model the dynamic behavior of test scenes.

The approach in accordance with the present embodiments offers diverse advantages. The scope of human interaction or human engagement in the testing of complex algorithms is clearly reduced. Since it is possible without any problems to also provide a particularly large amount of test data, the test coverage of complex algorithms may be significantly increased.

Since it is possible to test in a comprehensive and in-depth manner, it is possible to obtain particularly reliably functioning algorithms that represent a considerable advantage or are absolutely necessary for the field of image-supported control, such as inter alia within the scope of advanced driver assistance or autonomous driving. The quality and reliability of such systems may be considerably increased as a result and realized with a particularly manageable outlay. One further advantage resides in the fact that test harnesses and test vectors in accordance with the present embodiments are provided in just one preprocessing act.

In one embodiment, at least one test data set is generated for an algorithm that obtains an image sequence as an input and outputs areas of action that are dependent upon the image sequence as an output (e.g., for an algorithm of a system for autonomous vehicle control or a preferred advanced driver assistance system). For example, in act 2.1, a learning data set that includes a real image sequence that has been recorded by at least one image capturing facility, and areas of action that are associated with the images of the sequence and, for example, represent permissible control parameters for a system for the automated image-supported control of a facility is provided. In act 1.3, the stimulated artificial intelligence (e.g., at least one generative network of this artificial intelligence) generates at least one test data set that includes a new image sequence and areas of action that are associated with the new image sequence.

The approach in accordance with the present embodiments is suitable, for example, for the field of advanced driver assistance and also autonomous driving since it is to be provided in these fields that control commands are output in dependence upon image sequences (e.g., videos); however, the present embodiments are in no way limited to these two examples. On the contrary, test data sets may also be generated for algorithms from different fields (e.g., for such algorithms that are used within the scope of an image-supported, automated robot control or automated sorting processes on a conveyor belt). Algorithms for a control that is not image-supported but rather is based on sensor data may also be tested in accordance with the present embodiments.

In one embodiment, original, real image data (e.g., image sequences) and/or sensor data and associated areas of action are used as a learning data set in order to condition an artificial intelligence (e.g., a GAN system).

Accordingly, at least one image data set (e.g., an image sequence) and/or at least one sensor data set that may be provided by extensively known image capturing facilities of one or multiple cameras or sensor facilities may be provided. By way of example, it is possible to draw upon a camera that is provided in a vehicle or on a robot and records while the vehicle is traveling or the robot is operating. The image sequence that is obtained or the video that is obtained then represents, for example, a test vector. The areas of action that are associated with the real image data or sensor data are determined, the image data or sensor data and areas of action are allocated to one another, and the test data set is obtained. Alternatively to creating a real test data set initially in this manner, it is also possible to gain access to a provided test data set, provided that a suitable test data set is available.

In a next act, the artificial intelligence (e.g., a generative network of this artificial intelligence) may train with the real test data and subsequently, by way of example, may be stimulated using one or multiple random signals in order to generate new image data (e.g., image sequences) and/or sensor data and associated areas of action.

This newly obtained, synthetic test data may then be supplied to an algorithm that is to be tested (e.g., where applicable, in addition to the learning data set) in order to inspect this algorithm.

For example, for the case that at least one test data set is generated for an algorithm of an advanced driver assistance system or for a system for autonomous vehicle control, it is provided in a further embodiment that a learning data set that is provided so as to train the artificial intelligence includes an image sequence that includes images of driving situations, and/or that for each image, includes a driving trajectory as an associated area of action. In one embodiment, the learning data set also includes a desired corridor that is associated with the respective driving trajectory, and the desired corridor defines a desired region around the driving trajectory.

In one development, in act 1.3, at least one test data set is generated. The at least one test data set includes an image sequence including images of driving situations, and/or for each image, includes a driving trajectory as an associated area of action and, for example, a desired corridor that is associated with the respective driving trajectory. The desired corridor defines a desired region around the driving trajectory.

The present embodiments include a method for testing an algorithm including: 9.1—an algorithm that is to be tested is provided, and the algorithm obtains image data as an input and outputs areas of action that are dependent upon the image data as an output, and/or the algorithm obtains sensor data as an input and outputs areas of action that are dependent upon the sensor data as an output; 9.2—the method according to one of the present embodiments is implemented in order to obtain at least one test data set having image data and areas of action that are associated with the image data and/or having sensor data and areas of action that are associated with the sensor data; 9.3—the at least one test data set is provided; 9.4—the image data and/or the sensor data of the at least one test data set is supplied as an input to the algorithm that is to be tested; 9.5—the algorithm is executed and outputs areas of action as an output; 9.6—the areas of action that are output by the algorithm as an output are compared with the areas of action of the at least one test data set; and 9.7 a quality of the tested algorithm is concluded from the result of the comparison.

In an embodiment, in act 9.1, an algorithm of an advanced driver assistance system or for a system for autonomous vehicle control is provided as an algorithm that is to be tested.

One embodiment of the method in accordance with the present embodiments for testing an algorithm is characterized by the fact that following the implementation of the act 9.1 to 9.7, the act 1.2 and 1.3 of the method in accordance with the present embodiments for generating a test data set are performed again in order to generate at least one further test data set that is different from the previously generated test data set. The at least one further test data set is provided, and the acts 9.4 to 9.7 are repeated (e.g., in order to test further aspects of the algorithm).

This approach has proven to be particularly effective. It is, for example, possible by a repetition or also multiple repetitions of the generative acts to always test new and further aspects of an algorithm that is to be tested.

The present embodiments also include a method for operating a system for the automated (e.g., image-dependent and/or sensor-dependent) control of a facility (e.g., a vehicle or robot). The system includes at least one image capturing facility (e.g., a camera) and/or at least one sensor facility, and also one evaluating and control unit and one or more devices for controlling the facility. An algorithm is stored or is to be stored in the control and evaluating unit, and the algorithm obtains image data as an input and outputs areas of action that are dependent upon the image data and that, for example, represent reliable control parameters as an output. Alternatively or additionally, the algorithm obtains sensor data as an input and as an output outputs areas of action that are dependent upon the sensor data and that represent, for example, permissible control parameters in which the algorithm is tested while implementing the method in accordance with the present embodiments for testing an algorithm. For the case that the test indicates an insufficient function of the algorithm, the algorithm is adapted in a predetermined manner, and the facility is controlled using the algorithm.

The system may be, by way of example, such a system that is used for autonomous vehicle control or for a, for example, advanced driving assistance in vehicles (e.g., cars).

If a facility (e.g., a vehicle or a robot) is controlled based on an algorithm that is inspected using at least one test data set that is generated in the manner in accordance with the present embodiments (e.g., while implementing the method in accordance with the present embodiments for testing an algorithm), and has been adapted as required, the control may be performed in a particularly reliable manner, and the safety of the automated control may be clearly increased.

The method for operating a system for the automated (e.g., image-dependent and/or sensor-dependent) control of a facility is characterized, in an embodiment, by the fact that the system includes at least one image capturing facility, and a sequence of images is captured by the at least one image capturing facility of the system. Areas of action are allocated to the images of the sequence, and the image sequence having the allocated areas of action is provided as a learning data set in order to train the artificial intelligence (e.g., in act 2.1). Alternatively or additionally, it may be provided that the system includes at least one sensor facility, and sensor data is captured by the at least one sensor facility of the system, areas of action are allocated to the sensor data, and the sensor data having the allocated areas of action is provided as a learning data set in order to train the artificial intelligence (e.g., in act 2.1). Act 2.1 is, for example, a first step of the method in accordance with the present embodiments for generating a test data set, which is implemented in act 9.2 of the method in accordance with the present embodiments in order to test an algorithm in order to obtain a test data set.

The present embodiments also include use of a trained artificial intelligence that, for example, includes generative adversarial networks or is provided by such networks in order to generate at least one test data set for an algorithm that obtains image data as an input and outputs areas of action that are dependent upon the image data and that, for example, represent permissible control parameters as an output. Alternatively or additionally, the algorithm obtains sensor data as an input and outputs areas of action that are dependent upon the sensor data and that, for example, represent permissible control parameters as an output. It is to be noted that all the features that have been described above for the artificial intelligence and/or the at least one test data set may be realized in each case individually or in combination also within the scope of the use in accordance with the present embodiments.

The present embodiments include an apparatus that is embodied and configured so as to implement the method in accordance with the present embodiments for generating a test data set for an algorithm or for implementing the method in accordance with the present embodiments for testing an algorithm or for implementing the method in accordance with the present embodiments for operating a system for the automated (e.g., image-dependent) control of a facility.

The apparatus in accordance with the present embodiments may include at least one processor and, for example, one data storage device. The apparatus may include, by way of example, a computer (e.g., a PC) or may be embodied as such.

An apparatus in accordance with the present embodiments may also form, by way of example, part of a control system for a facility (e.g., a vehicle or a robot).

Likewise, the present embodiments include a computer program product including program code means for implementing the method in accordance with the present embodiments for generating a test data set for an algorithm or for implementing the method in accordance with the present embodiments for testing an algorithm or for implementing the method in accordance with the present embodiments for operating a system for the automated, image-dependent control of a facility.

The present embodiments also include the production of a data carrier on which at least one test data set is stored. The test data set is stored while implementing the method in accordance with the present embodiments for generating at least one test data set.

The present embodiments include a computer-readable medium that includes instructions that, when the instructions are executed on at least one computer, the at least one computer is triggered to implement the acts of the method in accordance with the present embodiments for generating a test data set for an algorithm, the acts of the method in accordance with the present embodiments for testing an algorithm, or the acts of the method in accordance with the present embodiments for operating a system for the automated, image-dependent control of a facility.

A computer-readable medium may be provided, by way of example, in the form of a data carrier (e.g., a CD-ROM, a DVD, or a flash memory, or USB storage device). A computer-readable medium is not to be understood only as a physical medium, but rather, such a computer readable medium may also be provided, by way of example, in the form of a data stream and/or a signal that represents a data stream.

BRIEF DESCRIPTION OF THE DRAWINGS

FIG. 5 shows a purely schematic representation of three exemplary test data sets having in each case an image sequence and associated areas of action in the form of associated driving trajectories and corridors.

DETAILED DESCRIPTION

Figure 1:
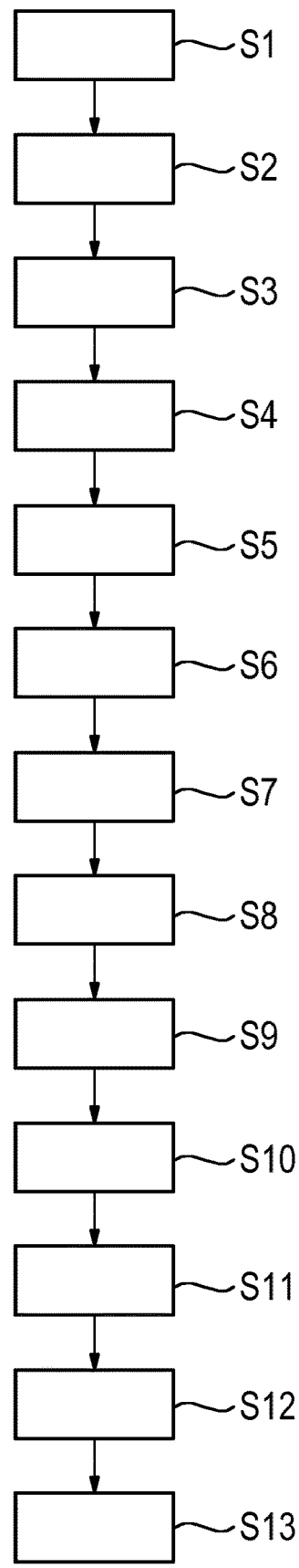
FIG. 1 shows a purely schematic representation for a sequence of an exemplary embodiment of a method for testing an algorithm.

FIG. 1 illustrates a purely schematic representation for a sequence of an exemplary embodiment of a method for testing an algorithm 1. The acts that are implemented within the scope of the exemplary embodiment are illustrated in this case in the figure in the manner of a block diagram or a plus diagram.

Within the scope of the illustrated exemplary embodiment, in a first act S1, an algorithm 1 that is to be tested is provided (e.g., a control algorithm 1 for autonomous vehicle control). The algorithm 1 for autonomous vehicle control, which is only illustrated in FIG. 4 and therein in a purely schematic manner by a block element, is embodied such that the algorithm obtains an image sequence in a known manner as an input (e.g., a video of the vehicle environment) and outputs areas of action that are dependent upon the image sequence as an output, and the areas of action represent control parameters for the vehicle that are permissible in dependence upon the respective image of the sequence.

Following the provision of the algorithm 1 in act S1, an exemplary embodiment of a method in accordance with the present embodiments for generating a test data set is implemented.

In this case (e.g., in act S2), a learning data set 2 that includes real image data in the form of a real image sequence 3 having a plurality of images 4 that are in chronological correlation and in the present case display multiple recordings of a driving situation is provided. The real image sequence 3 was recorded by an image capturing facility that is not illustrated in FIG. 2 (e.g., a camera that is provided in a vehicle, which is likewise not illustrated, while the vehicle completed a journey).

The learning data set 2, in addition to the image sequence 3, includes areas of action 5 that are associated with the image sequence, and the areas of action 5 in the present exemplary embodiment are provided by driving trajectories 6 that correspond to the respective images 4 of the image sequence 3 and also associated desired corridors 7 for the driving trajectories 6.

Figure 2:
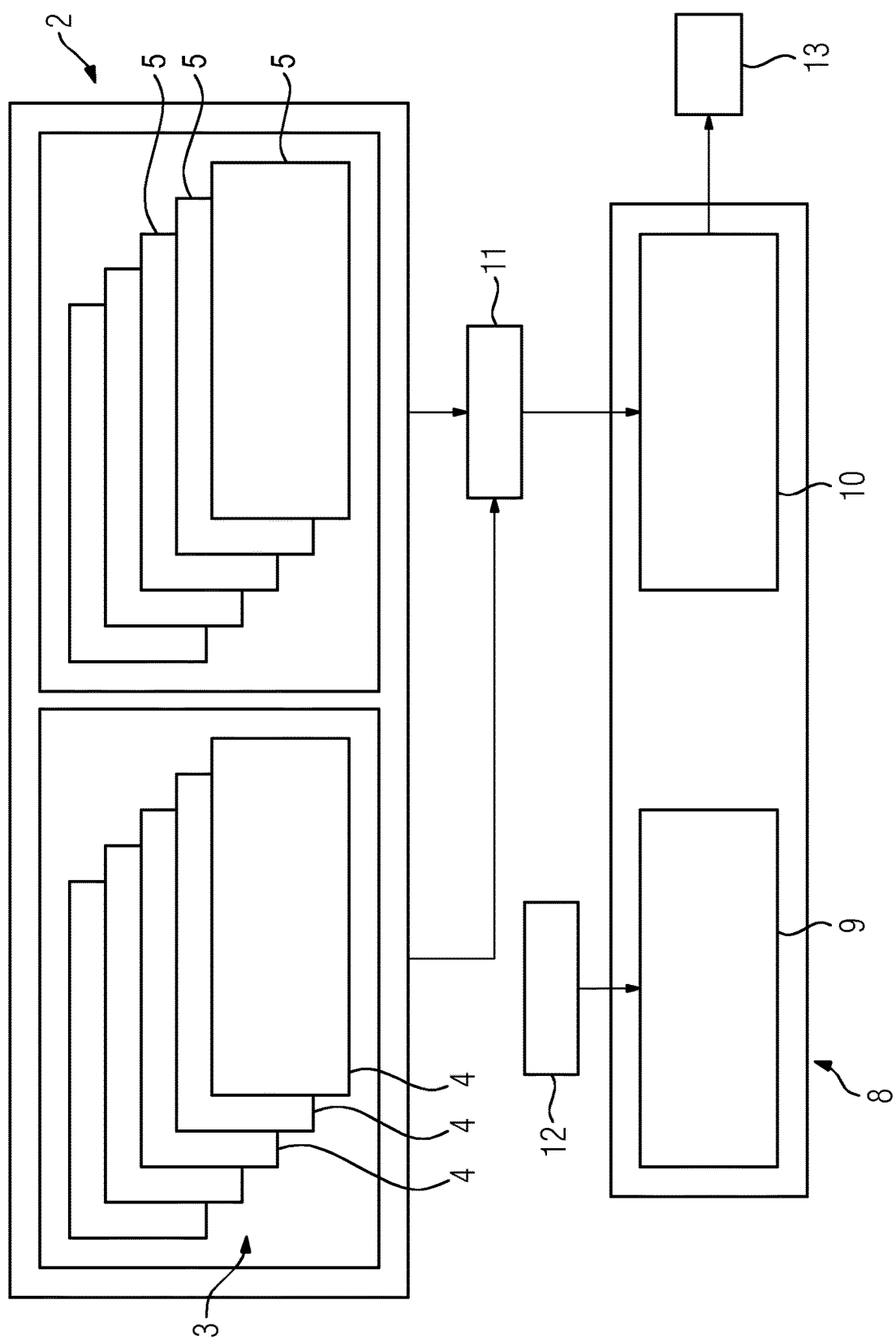
FIG. 2 shows a block diagram for a purely schematic illustration of exemplary conditioning of artificial intelligence.
Figure 3:
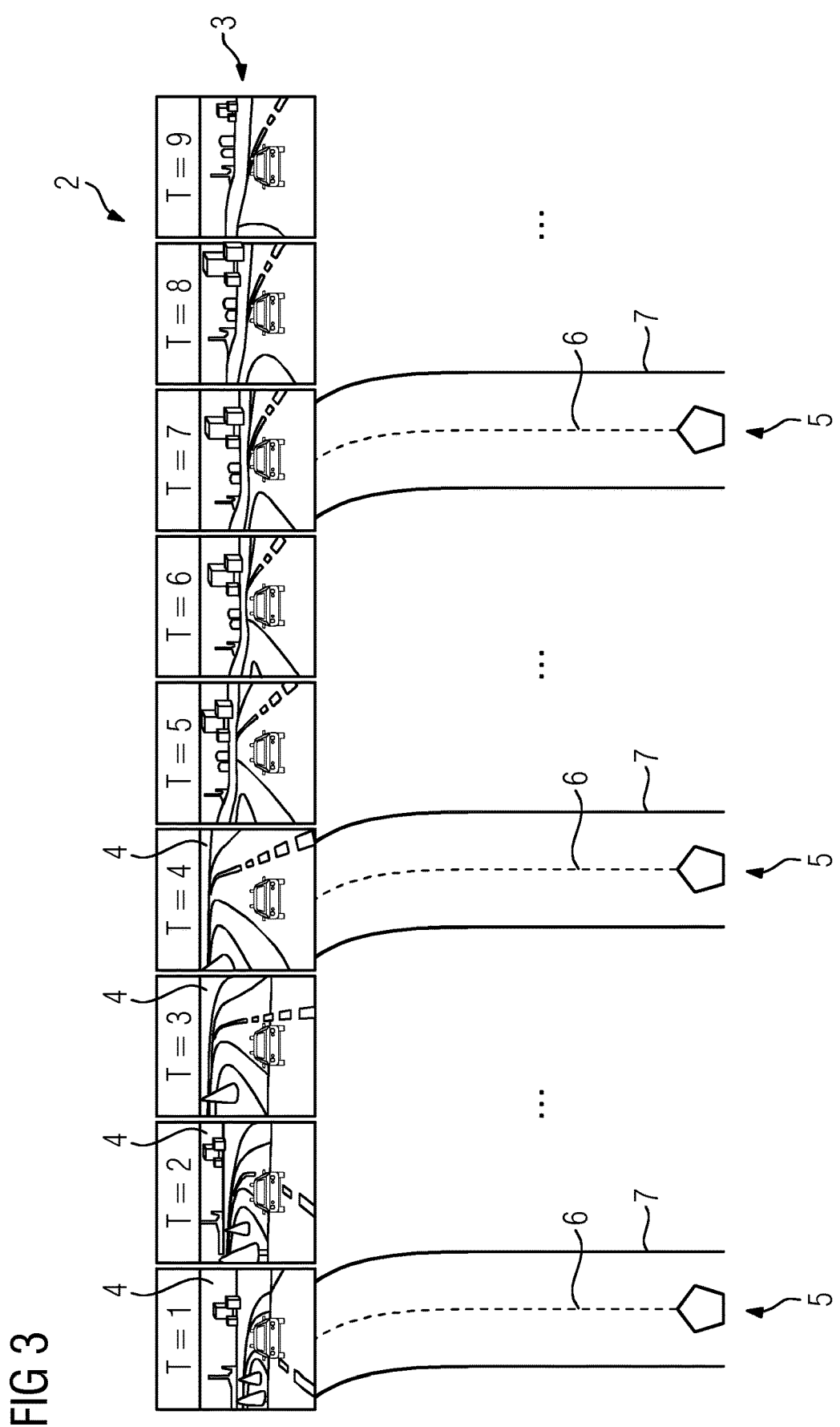
FIG. 3 shows a purely schematic representation of a learning data set having an image sequence and associated areas of action in the form of associated driving trajectories and corridors.

FIG. 2 illustrates the learning data set 2 in a purely schematic manner having block elements for the images 4 and areas of action 5, and FIG. 3 includes a likewise schematic illustration of the learning data set 2, in which, for example, nine images 4 and three, in each case, associated driving trajectories 6 and desired corridors 7 that form the associated areas of action 5 are illustrated. The desired corridors 7 define desired regions for the driving trajectories 6. The nine images 4 represent nine points in time that follow one another, which is indicated in FIG. 3 with the disclosure T=1 . . . 9 above the respective image 4.

In one act S3, an artificial intelligence 8 is provided that, in the case of the illustrated exemplary embodiment, is provided by long short-term memory generative adversarial networks (LSTM-GANs). The LSTM-GANs 8 are provided in the illustrated exemplary embodiment in the form of a long short-term memory generative network 9 and also a long short-term memory discriminative network 10, which is sketched in FIG. 2 in a purely schematic manner by block elements. The architecture of the two networks 9, 10 is as described in the essay "Generative Adversarial Networks" (GANs), ArXiv: 1406.2661 [statML]661v1, 10 Jan. 2014 by Goodfellow et al. In a deviation from this essay, the networks 9, 10 in the present case are not embodied as classical "convolutional" networks as in accordance with this essay but rather as "convolutional" LSTM networks 9, 10 (e.g., long short-term memory "convolutional" networks 9, 10 as are described in the essay "Long Short Term Memory" (LSTM) by Sepp Hochreiter and Jürgen Schmidhuber, neural computation 9 (8): 1735-1780, 1997).

In one act S4, the artificial intelligence 8 is conditioned using the learning data set 2 that is provided. In the case of the example described here, as is indicated in FIG. 2 in a purely schematic manner by arrows, the image sequence 3 and areas of action 5 are merged, which is sketched symbolically via a block element having the reference character 11 and is transferred to the LSTM discriminative network 10. The LSTM generating network 9 is stimulated via a stimulation input 12, and the outputs of the LSTM generating network (e.g., generated data) are likewise transferred to the LSTM discriminative system 10 that in each case makes a decision correct/incorrect, which is indicated by the block image element that is provided with the reference character 13. The stimulation input 12 may be provided by a random signal. It is also possible that the LSTM generating network 9 starts at zero.

The correct/incorrect decision 13 is, for example, the decision as to whether generated data that is output by the generative network 9 corresponds to data of the learning data set that is transferred to the discriminative network 10 or differs from this learning data set or not. The methods of the networks 9, 10 are, for example, improved until the generated data that is generated by the generative network 9 is as indistinguishable as possible from the data in accordance with the learning data set 2. In the context of the training of GANs, reference is also to be made to the introduction of the essay "Generative Adversarial Networks" (GANs) by Ian Goodfellow et al., ArXiv: 1406.2661 [statML]661v1, 10 Jan. 2014.

Following the conditioning, in act S5, the generative network 9 of the conditioned artificial intelligence 8 in the illustrated exemplary embodiment is stimulated by a random signal 12. This is illustrated schematically in FIG. 4. A random signal 12 may be provided by at least one image or at least one image file that is noisy or only displays noise, where this is to be understood in a purely exemplary manner.

New scenarios are generated by a random signal 12 as a response to an instance. Different dimensions are possible for this depending upon the trained construction. This may be considered like noise in television.

Alternatively or in addition to a random signal 12, it is also possible to use at least one stimulation image (e.g., two or more stimulation images or sequences having such stimulation images or at least one stimulation video) having real content (e.g., displaying driving situations) as stimulation input 12.

The LSTM generative network 9 that is stimulated generates at least one test data set 14 that includes a new image sequence 15 and also areas of action 16 that are associated with the new image sequence 15 (act S6). The at least one test data set 14 that is obtained using the conditioned LSTM generative network 9 in the case of the described exemplary embodiment in an analogy to the learning data set 2 includes an image sequence 15, however, having a plurality of synthetically generated images 17. The areas of action 16 that are provided for each image 17 of the sequence 15, likewise in an analogy to the learning data set 2, in each case include an associated driving trajectory 18 and also an associated desired corridor 19. In FIG. 5, this is illustrated again in a purely schematic and exemplary manner for altogether three test data sets 14 that are generated.

For the case that the artificial intelligence is supplied one or multiple stimulation images and/or one or multiple stimulation videos having real content (e.g., driving situations) as an input signal or input signals for the stimulation procedure, synthetic images may be generated or obtained by virtue of or by taking into consideration or by using a quasi-linearity property for visual concepts. In the context of the quasi-linearity property for visual concepts, reference is also made to the essay "Unsupervised Representation Learning with Deep Convolutional Generative Adversarial Networks" by Alec Redford et al. from the year 2016 (e.g., FIG. 7 therein on page 10).

Figure 4:
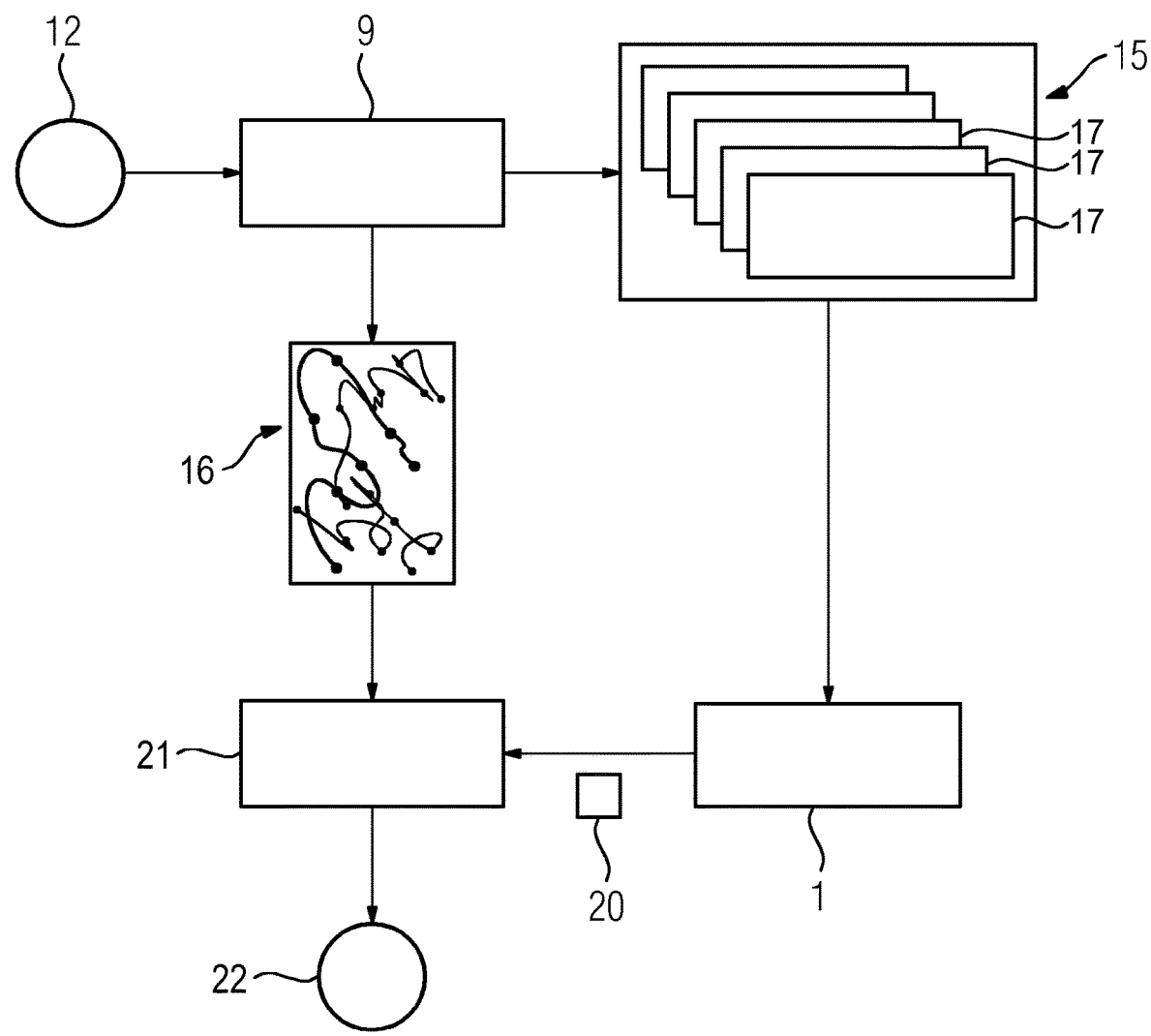
FIG. 4 shows a block diagram for a purely schematic illustration of one embodiment of the generation of a test data set and a procedure of testing an algorithm.

In act S7, at least one test data set 14 that is obtained in the manner described above is provided, and in act S8, the image sequence 15 is supplied as an input to the algorithm 1 that is to be tested, which is indicated in FIG. 4 in a purely schematic manner by a corresponding arrow that points from the image sequence 15 to the algorithm 1 that is illustrated schematically as a block element.

In act S9, the algorithm 1 is executed and outputs areas of action 20 as an output.

In act S10, the areas of action 20 that are output by the algorithm 1 as an output are compared with the areas of action 16 of the test data set 14 that is generated by the generative network 9. The comparison is illustrated schematically in the figure by a block element that is provided with the reference character 21.

In act S11, a quality or functionality of the tested algorithm 1 is concluded from the result of the comparison.

For the case that, on the basis of the result of the comparison, a sufficient quality or functionality of the algorithm 1 that is to be tested may be concluded, the areas of action 20 may be output as correct areas of action 22, which is illustrated in FIG. 4 again in a purely schematic manner by a block image element (act S12).

A vehicle may then be particularly reliably controlled based on the correct areas of action 22 (act S13).

If multiple test data sets 14 have been generated, the image sequences 15 of all the test data sets 14 may be supplied to the algorithm 1 that is to be tested. The areas of action 20 that are output by this algorithm in response to the image sequences may be compared to the areas of action 16 that are associated with the respective image sequence 15 (e.g., driving trajectories 18 and associated desired corridors 19) of the respective test data set 14, and a conclusion on the quality or functionality of the algorithm 1 may be made. If a plurality of test data sets 14 is generated and used, the algorithm 1 may be tested in a particularly comprehensive manner.

Although the invention has been further illustrated and described in detail by the exemplary embodiments, the invention is not limited in this manner by the disclosed examples. Other variations may be derived by the person skilled in the art from this invention without departing from the protective scope of the invention.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method for generating at least one test data set for an algorithm that obtains image data as an input and outputs areas of action that are dependent upon the image data as an output, an algorithm that obtains sensor data as an input and outputs areas of action that are dependent upon the sensor data as an output, or a combination thereof, the method comprising:
providing a trained artificial intelligence;
stimulating the trained artificial intelligence; and
generating, by the stimulated artificial intelligence, at least one test data set that comprises image data and areas of action that are associated with the image data, sensor data and areas of action that are associated with the sensor data, or a combination thereof, an area of action of the areas of action that are associated with the image data or the areas of action that are associated with the sensor data being partially defined by a control parameter or a control value that lies within a desired region or span,
wherein providing the trained artificial intelligence comprises obtaining the trained artificial intelligence, obtaining the trained artificial intelligence comprising:
providing a learning data set that comprises real image data that is recorded by at least one image capturing facility and areas of action that are associated with the real image data, real sensor data that is recorded by at least one sensor facility and areas of action that are associated with the real sensor data, or a combination thereof;
providing an artificial intelligence; and
conditioning the artificial intelligence using the provided learning data set.

2. The method of claim 1, wherein providing the learning data set comprises providing a learning data set that comprises a real image sequence that has been recorded by at least one image capturing facility, and areas of action that are associated with the images of the sequence, and generating the at least one test data set comprises generating, by the stimulated artificial intelligence, at least one test data set that comprises a new image sequence and areas of action that are associated with the new image sequence,
wherein providing the learning data set comprises providing a learning data set having a real image sequence, and the areas of action of the learning data set for each image of the real image sequence comprise at least one control parameter or values that represent the control parameters and comprises an associated desired region for each at least one control parameter or value that represents this control parameter; or
a combination thereof.

3. The method of claim 1, wherein at least one test data set is generated for an algorithm of an advanced driver assistance system or for a system for autonomous vehicle control, and the learning data set that is provided comprises an image sequence that comprises images of driving situations, that for each image comprises a driving trajectory as an associated area of action, or a combination thereof.

4. The method of claim 1, wherein at least one test data set is generated for an algorithm that obtains an image sequence as an input and outputs areas of action that are dependent upon the image sequence as an output.

5. The method of claim 1, wherein generating the at least one test data set comprises generating at least one test data set that comprises an image sequence that comprises images of driving situations, that for each image comprises a driving trajectory as an associated area of action, or a combination thereof.

6. The method of claim 1, wherein providing the trained artificial intelligence comprises providing a trained artificial intelligence that comprises long short-term memory networks, or providing, by the long short-term memory networks, the trained artificial intelligence.

7. The method of claim 1, wherein providing the trained artificial intelligence comprises providing an artificial intelligence that comprises at least one generative network, at least one discriminative network, or the at least one generative network and the at least one discriminative network, or is provided by the at least one generative network, the at least one discriminative network, or the at least one generative network and the at least one discriminative network.

8. A method for testing an algorithm, the method comprising:
providing an algorithm that is to be tested, and obtaining, by the algorithm, image data as an input and outputting areas of action that are dependent upon the image data as an output, obtaining, by the algorithm, sensor data as an input and outputting areas of action that are dependent upon the sensor data as an output, or a combination thereof;
obtaining at least one test data set having image data and areas of action that are associated with the image data, having sensor data and areas of action that are associated with the sensor data, or having a combination thereof, an area of action of the areas of action that are associated with the image data or the areas of action that are associated with the sensor data being partially defined by a control parameter or a control value that lies within a desired region or span;
providing the at least one test data set;
supplying the image data, the sensor data, or the image data and the sensor data of the at least one test data set as an input to the algorithm that is to be tested;
executing the algorithm and outputting areas of action as an output;
comparing the areas of action that are output by the algorithm as an output with the areas of action of the at least one test data set; and
concluding a quality of the tested algorithm from a result of the comparing.

9. The method of claim 8, following the concluding, further comprising:

generating at least one further test data set that is different than the previously generated test data set;
providing the at least one further test data set; and
repeating the supplying, the executing, the comparing, and the concluding using the at least one further test data set.

10. The method of claim 9, wherein generating the at least one further test data set comprises:
providing a trained artificial intelligence; and
stimulating the trained artificial intelligence.

11. A method for operating a system for automated control of a facility, wherein the system comprises at least one image capturing facility, at least one sensor facility, an evaluating and control unit, and means for controlling the facility, the method comprising:
storing an algorithm in the control and evaluating unit; and
obtaining, by the algorithm, image data as an input and outputting areas of action that are dependent upon the image data as an output, or obtaining, by the algorithm, sensor data as an input and outputting areas of action that are dependent upon the sensor data as an output, an area of action of the areas of action that are dependent upon the image data or the areas of action that are dependent upon the sensor data being partially defined by a control parameter or a control value that lies within a desired region or span;
testing the algorithm; and
for the case that the test indicates an insufficient function of the algorithm, adapting the algorithm in a predetermined manner and controlling the facility using the algorithm.

12. The method of claim 11, wherein;
the system further comprises at least one image capturing facility, and the method further comprises:
capturing a sequence of images by the at least one image capturing facility of the system;
allocating areas of action to the images of the sequence of images; and
providing the sequence of images having the allocated areas of action as a learning data set, such that the artificial intelligence is trained;
the system further comprises at least one sensor facility, and the method further comprises:
capturing sensor data by the at least one sensor facility of the system;
allocating areas of action to the sensor data; and
providing the sensor data having the allocated areas of action as the learning data set, such that the artificial intelligence is trained; or
a combination thereof.

13. The method of claim 11, wherein testing the algorithm comprises:
providing the algorithm that is to be tested;
obtaining at least one test data set having image data and areas of action that are associated with the image data, having sensor data and areas of action that are associated with the sensor data, or having a combination thereof;
providing the at least one test data set;
supplying the image data, the sensor data, or the image data and the sensor data of the at least one test data set as an input to the algorithm that is to be tested;
executing the algorithm and outputting areas of action as an output;
comparing the areas of action that are output by the algorithm as an output with the areas of action of the at least one test data set; and
concluding a quality of the tested algorithm from a result of the comparing.

14. In a non-transitory computer-readable storage medium that stores instructions executable by at least one computer to generate at least one test data set for an algorithm that obtains image data as an input and outputs areas of action that are dependent upon the image data as an output, an algorithm that obtains sensor data as an input and outputs areas of action that are dependent upon the sensor data as an output, or a combination thereof, the instructions comprising:
providing a trained artificial intelligence;
stimulating the trained artificial intelligence; and
generating, by the stimulated artificial intelligence, at least one test data set that comprises image data and areas of action that are associated with the image data, sensor data and areas of action that are associated with the sensor data, or a combination thereof, an area of action of the areas of action that are associated with the image data or the areas of action that are associated with the sensor data being partially defined by a control parameter or a control value that lies within a desired region or span,
wherein providing the trained artificial intelligence comprises obtaining the trained artificial intelligence, obtaining the trained artificial intelligence comprising:
providing a learning data set that comprises real image data that is recorded by at least one image capturing facility and areas of action that are associated with the real image data, real sensor data that is recorded by at least one sensor facility and areas of action that are associated with the real sensor data, or a combination thereof;
providing an artificial intelligence; and
conditioning the artificial intelligence using the provided learning data set.

* * * * *